(12) United States Patent
Lind

(10) Patent No.: US 6,938,385 B2
(45) Date of Patent: Sep. 6, 2005

(54) FIXING ELEMENT FOR LAMINATED GLASS AND AN ASSEMBLY COMPRISING A FIXING ELEMENT THAT IS ANCHORED IN A PLATE-TYPE MULTI-LAYER BODY

(75) Inventor: Stefan Lind, Waldachtal (DE)

(73) Assignee: fischerwerke Artur Fischer GmbH & Co. KG, Waldachtal (DE)

( * ) Notice: Subject to any disclaimer, the term of this patent is extended or adjusted under 35 U.S.C. 154(b) by 269 days.

(21) Appl. No.: 10/258,319

(22) PCT Filed: Apr. 12, 2001

(86) PCT No.: PCT/EP01/04238

§ 371 (c)(1),
(2), (4) Date: Oct. 21, 2002

(87) PCT Pub. No.: WO01/88305

PCT Pub. Date: Nov. 22, 2001

(65) Prior Publication Data

US 2003/0138307 A1 Jul. 24, 2003

(30) Foreign Application Priority Data

May 13, 2000 (DE) ..................... 200 08 684 U

(51) Int. Cl.⁷ ................................ F16B 39/00
(52) U.S. Cl. ................... 52/204.7; 52/704; 52/235; 411/107
(58) Field of Search .................. 411/508, 511, 411/516, 509, 107; 52/204.7, 235, 506.05, 704, 707

(56) References Cited

U.S. PATENT DOCUMENTS

| | | | | |
|---|---|---|---|---|
| 2,487,330 A | * | 11/1949 | Green ............... | 411/549 |
| 3,037,542 A | * | 6/1962 | Boyd ............... | 151/21 |
| 4,214,416 A | | 7/1980 | Fischer | |
| 4,952,107 A | * | 8/1990 | Dupree ............. | 411/103 |
| 5,106,250 A | * | 4/1992 | Fischer et al. ...... | 411/107 |
| 5,301,396 A | * | 4/1994 | Benoit .............. | 24/453 |
| 5,314,280 A | * | 5/1994 | Gagliardi et al. .... | 411/182 |
| 5,531,535 A | * | 7/1996 | Lind ................ | 403/297 |
| 6,632,056 B1 | * | 10/2003 | Lind ................ | 411/107 |

FOREIGN PATENT DOCUMENTS

| | | |
|---|---|---|
| EP | 0 440 896 B1 | 1/1994 |
| EP | 0 647 760 A | 4/1995 |
| WO | 95 16098 A | 6/1995 |

* cited by examiner

*Primary Examiner*—Brian E. Glessner
*Assistant Examiner*—Basil Katcheves
(74) *Attorney, Agent, or Firm*—Michael J. Striker

(57) ABSTRACT

The invention relates to a fixing element (10) for anchoring in a drilled hole (30, 32) having an undercut (28) in a laminated body (24, 26), for example, laminated glass. The fixing element (10) has an expander cone (14), onto which an expansion ring (16) can be pushed. To be able to compensate for misalignment between the layers (24, 26) of the laminated body (24, 26), the drilled hole (30) in an outer layer (24) is drilled with a larger diameter than in a further layer (26) of the laminated body (24, 26). The invention proposes constructing a washer (18) of the fixing element (10) with an injection opening (22), through which the gap between a threaded shank (12) of the fixing element (10) and the wall of the drilled hole (30) in the outer layer (24) of the laminated body (24, 26) can be filled with a sealing compound (26)². (FIG. 2).

7 Claims, 1 Drawing Sheet

Figure 1:
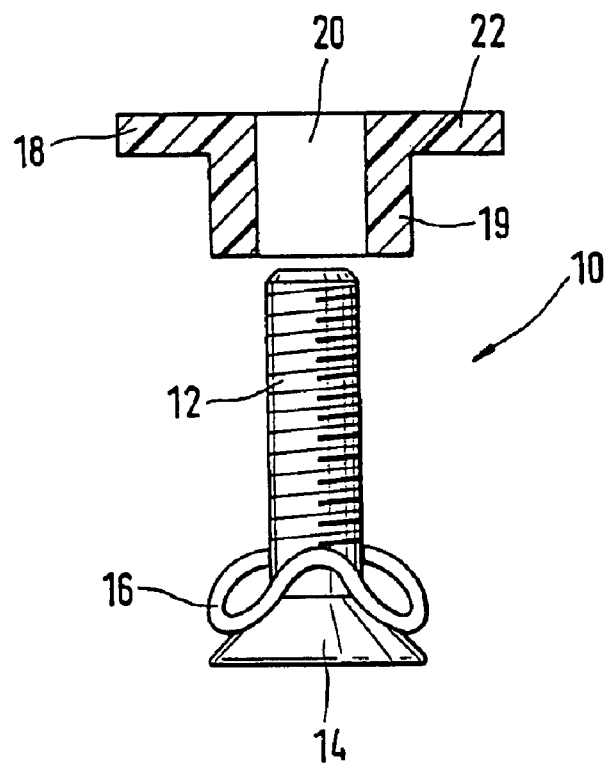

FIXING ELEMENT FOR LAMINATED GLASS AND AN ASSEMBLY COMPRISING A FIXING ELEMENT THAT IS ANCHORED IN A PLATE-TYPE MULTI-LAYER BODY

The invention relates to a fixing element having the features in the preamble to claim 1, which is provided for anchoring in a drilled hole having an undercut in laminated glass or other panel-form laminated body. The invention relates furthermore to an arrangement of the fixing element having the features of the preamble to claim 4 anchored in a laminated body.

Such a fixing element for anchoring a facing panel that permits only a small depth of drilled hole is known from EP 0 440 896 B1. The known fixing element comprises a threaded shank with an expander cone. An expansible element is placed on the threaded shank, the expansible element being expanded by being pushed onto the expander cone and thereby engaging with a positive fit behind the undercut of the drilled hole. The expansible element of the known fixing element is in the form of an expansion ring, which, for example, in plan view, has an oval form and/or in side view is of undulating form and can consequently be expanded by being pushed onto the expander cone. Expansion of the expansible element anchors the fixing element in the undercut of the drilled hole.

After anchoring the fixing element, a washer that covers the drilled hole is placed on the threaded shank and a nut is screwed onto the threaded shank.

If the known fixing element is to be anchored in laminated glass, the following problem arises: the laminated glass (safety glass) comprises panes of glass cemented to one another. More generally, laminated glass can be understood to be a laminated body that consists of several layers. Such a laminated body might be, for example, also a solar panel, to which the invention can be applied in the same way as it is to laminated glass. Drilling the drilled hole in the laminated body is carried out before the individual layers are joined to form the laminated body. The problem arises that when the layers have been put together to form the laminated body, the drilled holes in the individual layers are offset with respect to one another because of misalignment of the layers.

The invention is based on the problem of proposing a fixing element of the kind described in the introduction that is suitable for anchoring in a drilled hole having an undercut in a laminated body, such as laminated glass or a solar panel, for example.

That problem is solved in accordance with the invention by the features of claim 1. In the case of the fixing element according to the invention having the features of claim 1, the washer placed on the threaded shank has an injection opening. The injection opening is accessible at the outside of the washer and, on the side of the washer facing the expander cone, discharges in the circumferential region of the threaded shank. The outside, at which the injection opening is accessible, need not be an end face of the washer, but can be the circumference as well. A filling compound can be introduced through the injection opening into the gap between the threaded shank of the fixing element and the wall of the drilled hole. This enables the drilled hole to be drilled in an outer layer of the laminated body with a larger diameter than the threaded shank of the fixing element and the drilled hole in a further layer of the laminated body. This ensures that even when the layers of the laminated body are misaligned, the drilled hole in the outer layer opens into the drilled hole in the further layer and overlap of the drilled holes in the outer and the further layer is large enough for the fixing element with the expander cone to be inserted into the undercut of the drilled hole. After anchoring of the fixing element according to the invention, the gap between the threaded shank of the fixing element and the wall of the larger-diameter drilled hole in the outer layer of the laminated body can be filled through the injection opening with a filing compound. The filling compound is especially a sealing compound, for example, silicone, which seals the drilled hole shank[1] in the drilled hole. Alternatively, a different filling compound can be introduced, for example, plastics material, which provides lateral support for the threaded shank in the hole drilled in the outer layer.

[1]Presumably "drilled hole shank" is in error here for "threaded shank"—translator.

In a preferred embodiment of the invention, the washer comprises plastics material to protect the laminated body from damage when, for example, a nut is screwed onto the threaded shank.

The expansible element of the fixing element according to the invention is especially in the form of an expansible expansion ring.

Furthermore, the invention relates to an arrangement with the fixing element according to the invention having the features according to claim 4 anchored in a panel-form laminated body. The laminated body is, for example, laminated glass (safety glass) or a solar panel.

Figure 2:
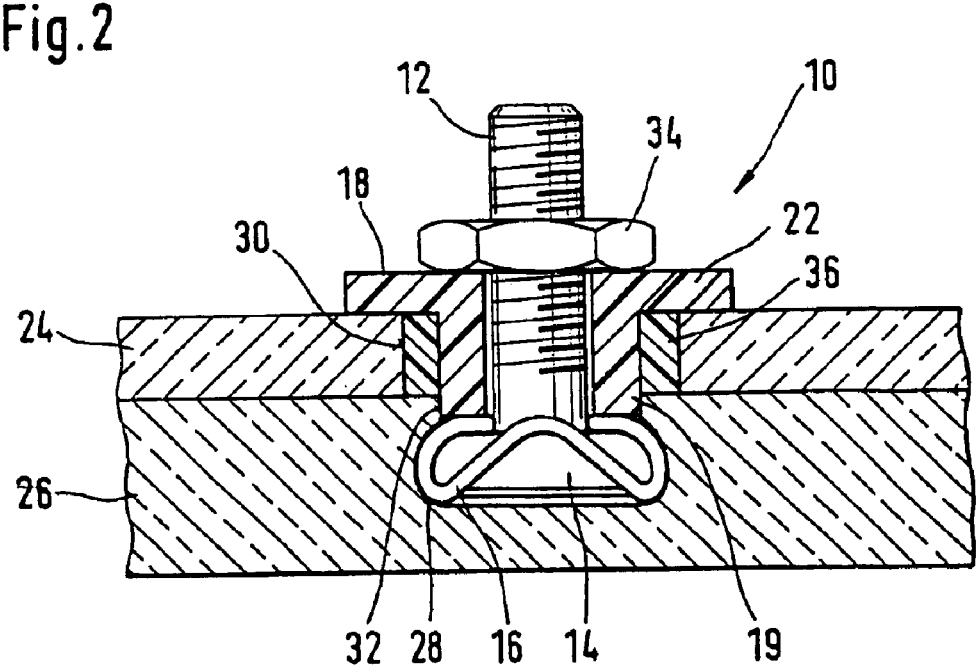

The invention is explained in detail hereinafter with reference to an exemplary embodiment illustrated in the drawings, in which:

FIG. 1 shows a fixing element according to the invention in an exploded view, and FIG. 2 shows an arrangement according to the invention using the fixing element of FIG. 1.

The fixing element 10 according to the invention illustrated in the drawings comprises a threaded shank 12 with an expander cone 14, which is integral with the threaded shank 12 and arranged at one end thereof. An expansion ring 16 is placed on the threaded shank 12 as expansible element. In side view, the expansion ring 16 is of undulating form and can be expanded by being pushed onto the expander cone 14. The threaded rod 12 with the expander cone 14 and the expansion ring 16 consist of steel.

Furthermore, the fixing element 10 has a washer 18 of plastics material with a central hole 20. The washer 18 has an integral tubular collar 19, which faces the expander cone 14 when the washer is in its correct mounted position. The central hole 20 passes through the collar 19. The washer 18 has an obliquely running channel 22, which runs from the side of the washer facing the expander cone 14 outwardly to the side of the washer 18 remote from the expander cone 14. On the side facing the expander cone 14, the channel 22 opens out at the outer circumference of the collar 19.

The fixing element 10 is intended, as shown in FIG. 2, for anchoring in a laminated body 24, 26, which comprises an outer layer 24 and at least one further layer 26. As shown in FIG. 2, the laminated body 24, 26 can be, for example, laminated glass (safety glass) 24, 26 or alternatively, for example, a solar panel (not shown), which is normally of laminated construction. The laminated glass 24, 26 comprises two or more glass panes 24, 26, which are joined by adhesion to form the laminated glass 24, 26. The thickness of the laminated glass 24, 26 restricts the depth of a drilled hole made therein.

To anchor the fixing element 10, a drilled hole (blind bore) having an undercut 28 is made in the laminated glass 24, 26. The drilled hole 30, 32 is made separately in each glass pane 24, 26 prior to cementing of the two glass panes 24, 26, the undercut 28 in the exemplary embodiment illustrated being made completely and exclusively in the further glass pane 26. Once the drilled hole 30, 32 has been made in the glass panes 24, 26, the glass panes 24, 26 are cemented to one another to form the laminated glass 24, 26. Since the glass panes 24, 26 can become displaced relative to one another as they are cemented, the drilled hole 30, 32 in the outer glass pane 24 has a larger diameter than in the further glass pane 26. This ensures that even when the drilled hole 30 in the outer glass pane 24 is misaligned relative to the drilled hole 32 in the further glass pane 26 owing to cementing of the two glass panes 24, 26, the drilled hole 30 in the outer glass pane 24 opens into the drilled hole 32 in the further glass pane 26. Furthermore, the larger diameter of the drilled hole 30 in the outer glass pane 24 ensures that the fixing element 10 with the expander cone 14 and the expansion ring 16 can be inserted through the drilled hole 30 in the outer glass pane 24 into the undercut 28 in the further glass pane 26 even when the drilled hole 30 in the outer glass pane 24 is misaligned with respect to the drilled hole 32 in the further glass pane 26.

After the fixing element 10 with its expander cone 14 has been inserted into the undercut 28, the expansion ring 16 placed on the threaded shank 12 is pushed by means of a tubular setting tool, not shown, onto the expander cone 14. As this happens, the expansion ring 16 expands and engages with a positive fit behind the undercut 28, so that the fixing element 10 is anchored in the laminated glass 24, 26. After anchoring the fixing element 10, the setting tool, not shown, is removed and the washer 18 is placed, with the collar 19 leading, onto the threaded shank 12 of the fixing element 10 projecting from the laminated glass 24, 26. Following the washer 18, a nut 34 is screwed onto the threaded shank 12 until it lies on the washer 18. The gap between the collar 19 of the washer 18 and the wall of the drilled hole 30 in the outer glass pane 24 is filled with a filling compound 36, for example, silicone, through the channel forming the injection opening 22 in the washer 18. The filling compound 36 seals the fixing element 10 in the drilled hole 30; it can also support the fixing element 10 against transverse forces in the drilled hole 30. If desired, the expansion ring 16 can also be pushed onto the expander cone 14, and consequently expanded, by means of the collar 19 of the washer 18 by screwing the nut 34 onto the threaded shank 12. A separate setting tool is not needed in that case.

What is claimed is:

1. Fixing element for laminated glass, having a threaded shank with an expander cone, having an expansible element with a central hole slidably placed on the threaded shank, which expansible element is expandable by being pushed onto the expander cone, and having a washer placeable on the threaded shank, characterised in that the washer (18) has an injection opening (22) which extends through the washer (18) and, on the side of the washer (18) facing the expander cone (14), discharges towards the circumference of the threaded shank (12), so that a filing compound (36) can be introduced through the injection opening (22) in the washer (18).

2. Fixing element according to claim 1, characterised in that the washer (18) comprises plastic material.

3. Fixing element according to claim 1, characterised in that the expansible element is an expansion ring (18).

4. Arrangement with a fixing element anchored in a panel-form laminated body, characterised in that an outer layer (24) of the laminated body (24, 26) has a drilled hole (30) passing through it, which drilled hole opens into a drilled hole (32) having an undercut (28) in a further layer (26) of the laminated body (24, 26), in that the fixing element (10) comprises a threaded shank (12) with an expander cone (14), the expander cone (14) being located in the undercut (28) in the further layer (26) of the laminated body (24, 26), in that an expansible element (16) is pushed onto the expander cone (14) and thereby expanded so that the expansible element (16) engages with a positive fit behind the undercut (28), and in that a washer (18) that covers the drilled hole (30) in the outer layer (24) of the laminated body (24, 26) is placed on the threaded shank (12), in that the drilled hole (30) in the outer layer (24) of the laminated body (24, 26) has a larger diameter than the threaded shank (12) of the fixing element (10) and than the drilled hole (32) in the further layer (26) of the laminated body (24, 26), in that the washer (18) has an injection opening (22) which is accessible on the outside of the washer (18) and which discharges into the gap between the threaded shank (12) of the fixing element (10) and the wall of the drilled hole (30) in the outer layer (24) of the laminated body (24, 26), and in that a filling compound (26) is introduced through the injection opening (22) into the gap.

5. Arrangement element according to claim 4, characterised in that the filling compound (36) is a sealing compound.

6. Arrangement element according to claim 4, characterised in that the laminated body (24, 26) is laminated glass (24, 26).

7. Arrangement element according to claim 4, characterised in that the laminated body (24, 26) is a solar panel.

\* \* \* \* \*